(12) United States Patent
Hundley et al.

(10) Patent No.: US 9,376,074 B2
(45) Date of Patent: Jun. 28, 2016

(54) ARCHITECTED AUTOMOTIVE IMPACT BEAM

(71) Applicant: GM GLOBAL TECHNOLOGY OPERATIONS LLC, Detroit, MI (US)

(72) Inventors: Jacob M. Hundley, Los Angeles, CA (US); Nilesh D. Mankame, Ann Arbor, MI (US); Alan J. Jacobsen, Woodland Hills, CA (US); Eric C. Clough, Santa Monica, CA (US); Hanif Muhammad, Ann Arbor, MI (US); Stuart J. Brown, Flint, MI (US); Elisabeth J. Berger, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 19 days.

(21) Appl. No.: 14/262,309

(22) Filed: Apr. 25, 2014

(65) Prior Publication Data

US 2015/0307044 A1 Oct. 29, 2015

(51) Int. Cl.
*B60R 19/18* (2006.01)
*B60R 19/03* (2006.01)
*B29C 35/08* (2006.01)
*B29C 39/02* (2006.01)
*B29C 39/10* (2006.01)
(Continued)

(52) U.S. Cl.
CPC ............. *B60R 19/03* (2013.01); *B29C 35/0805* (2013.01); *B29C 35/0894* (2013.01); *B29C 39/025* (2013.01); *B29C 39/10* (2013.01); *B29C 39/38* (2013.01); *B29C 65/48* (2013.01); *B60R 19/18* (2013.01); *B60R 21/00* (2013.01); *B29C 2035/0827* (2013.01); *B29L 2009/00* (2013.01); *B29L 2031/3044* (2013.01); *B60R 2019/1806* (2013.01); *B60R 2019/1846* (2013.01); *B60R 2019/1866* (2013.01); *B60R 2019/1873* (2013.01); *B60R 2019/1886* (2013.01)

(58) Field of Classification Search
CPC B29C 39/10; B29C 39/025; B60R 2019/186; B60R 19/18; B60R 2019/1873; B60R 2019/1846; B60R 19/03
USPC ............................... 293/120, 133; 296/147.6
See application file for complete search history.

(56) References Cited

U.S. PATENT DOCUMENTS

| 4,387,920 A | 6/1983 | Slaughter et al. |
| 4,504,534 A | 3/1985 | Adachi et al. |

(Continued)

FOREIGN PATENT DOCUMENTS

| EP | 1 300 293 A1 | 4/2003 | |
| FR | 2810941 A1 * | 1/2002 | .............. B60R 19/18 |
| FR | WO 2006136745 A2 * | 12/2006 | .............. B60R 19/12 |

OTHER PUBLICATIONS

Eldridge, David. "DuPont shows auto composite impact beam at K preview" Plastics News, European Plastics News, Jun. 14, 2013.

(Continued)

*Primary Examiner* — Pinel Romain
(74) *Attorney, Agent, or Firm* — John A. Miller; Miller IP Group, PLC

(57) ABSTRACT

A curved sandwich impact structure for a vehicle having a micro-truss core. In one embodiment, the sandwich impact structure includes a micro-truss layer sandwiched between two facesheets, a micro-truss layer designed for energy absorption on the outside of one of the facesheets, and a fascia panel in contact with the energy absorbing micro-truss layer.

24 Claims, 3 Drawing Sheets

(51) Int. Cl.
  *B29C 39/38* (2006.01)
  *B29C 65/48* (2006.01)
  *B60R 21/00* (2006.01)
  *B29L 9/00* (2006.01)
  *B29L 31/30* (2006.01)

(56) References Cited

U.S. PATENT DOCUMENTS

| | | | |
|---|---|---|---|
| 4,978,582 | A | 12/1990 | Stamm et al. |
| 5,385,375 | A | 1/1995 | Morgan et al. |
| 5,804,511 | A | 9/1998 | Kelman et al. |
| 7,382,959 | B1 | 6/2008 | Jacobsen |
| 7,653,279 | B1 | 1/2010 | Jacobsen |
| 7,677,615 | B2 * | 3/2010 | Emura .................. B60R 19/18 293/102 |
| 7,819,462 | B1 | 10/2010 | Owens |
| 7,938,463 | B2 * | 5/2011 | Lee ..................... B60R 19/18 293/120 |
| 8,017,193 | B1 * | 9/2011 | Zhou ................... G02B 6/1221 385/129 |
| 8,307,932 | B2 * | 11/2012 | Steller ................. B60R 19/48 180/68.1 |
| 2008/0001417 | A1 * | 1/2008 | Asahi .................. B60R 19/18 293/155 |
| 2008/0048462 | A1 | 2/2008 | Zabik |
| 2011/0210579 | A1 * | 9/2011 | Marur ................ B60N 2/42709 296/187.03 |
| 2012/0138223 | A1 * | 6/2012 | Fang ................... B29C 35/0805 156/275.5 |
| 2013/0038076 | A1 | 2/2013 | Benvenuto et al. |
| 2013/0193698 | A1 * | 8/2013 | Nagwanshi ............ B60R 19/18 293/120 |
| 2013/0273347 | A1 * | 10/2013 | Jacobsen ................. B32B 3/26 428/304.4 |
| 2014/0035202 | A1 * | 2/2014 | Southwell ............ C08G 65/18 264/401 |
| 2014/0272277 | A1 * | 9/2014 | Schaedler ............... C09D 1/00 428/116 |
| 2015/0001862 | A1 * | 1/2015 | Son ....................... B60R 19/03 293/120 |
| 2015/0111158 | A1 * | 4/2015 | Schmaelzle ........... G02B 6/138 430/320 |
| 2015/0111979 | A1 * | 4/2015 | Yang ..................... C08G 75/14 522/15 |

OTHER PUBLICATIONS

Strano, M. et al. "Non-Conventional Technologies for the Manufacturing of Anti-Intrusion Bars" Politecnico di Milano, Dipartimento di Meccanica, Italy.

* cited by examiner

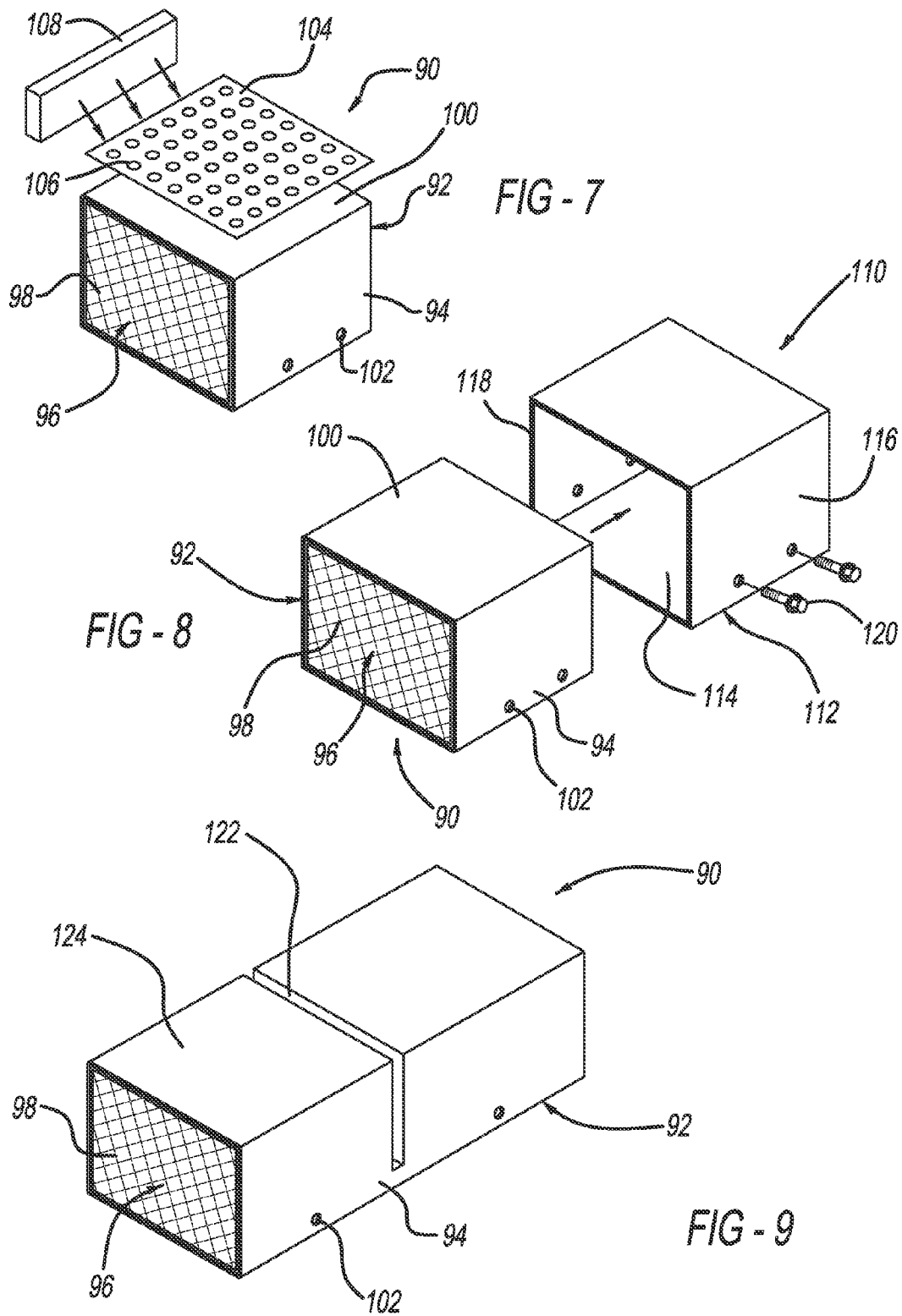

ARCHITECTED AUTOMOTIVE IMPACT BEAM

BACKGROUND OF THE INVENTION

1. Field of the Invention

This invention relates generally to a curved sandwich impact structure and, more particularly, to a curved impact structure including a micro-truss core sandwiched between a top and bottom skin having an energy absorbing micro-truss layer on the outside of the top skin.

2. Discussion of the Related Art

Modern vehicles are equipped with a number of impact beams providing structural integrity against collisions and impacts with objects, such as other vehicles. More particularly, impact beams are traditionally used in vehicle designs to protect occupants from front, side and/or rear impacts by absorbing energy through deformation in the event of a vehicle crash and distributing the applied dynamic loads to other energy absorbing sub-systems on the vehicle. For example, it is known to provide impact beams in a front energy management or bumper assembly, a rear energy management or bumper assembly and side impact assemblies on a vehicle. Impact beams at the front and rear of the vehicle are usually referred to as bumper beams, and impact beams on the sides of the vehicle are sometimes referred to as anti-intrusion bars. In all cases, it is desirable to provide an impact beam with low mass, high flexural stiffness and strength, and high energy absorption per unit mass. The lightweight requirement is predicated by fuel economy standards and the fact that impact beams are located both very close to and very far from the vehicle's center of mass. Maximizing the flexural stiffness and strength is necessary if the beam is to survive low speed impacts without damage and transfer impact loads throughout the duration of a high speed impact event. Further, a high level of energy absorption translates into reduced load transfer to the occupants of the vehicle, thus increasing safety.

In one known vehicle front energy management system, an impact beam is comprised of a top and bottom facesheet in combination with an internal structural core for providing high energy impact resistance in a light weight and cost effective manner. Typically, the impact beam for such a system includes aluminum, steel, carbon fiber, etc. layers that are extruded, roll-formed, etc. A hard energy absorbing layer may be formed on the impact beam having the general shape of an outer fascia trim panel on the side closer to the fascia and that of the front face of the impact beam on the side closer to the impact beam. A soft energy absorbing layer is then formed on the hard energy absorbing layer and the front fascia panel is then provided over the soft energy absorbing layer. The combination of the hard energy absorbing layer and the soft energy absorbing layer provides a transition between the impact beam and the front fascia panel so as to allow the system to conform to the desired shape of the front fascia panel which may have significant angles and forms required by the vehicle styling. The hard energy absorbing layer and the soft energy absorbing layer also provide a transition between the fascia panel and the impact beam to effectively absorb low speed impacts without compromising system integrity.

It is known in the art to provide vehicle impact beams having sandwich structures. These prior art impact beams can generally be categorized into three designs, namely, hollow beams that are fully or partially reinforced with a polymer or metallic foam, single or dual-sided facesheets reinforced with a honeycomb-like cellular core, and formed composite impact beams. For hollow metallic or polymer matrix composite tube structures which are fully or partially reinforced with a lightweight foam core, the material used for the core can be either a metallic or polymeric foam that is bonded, mechanically attached or interference fit into the tube structure. The purpose of the core is to carry shear loads in the sandwich structures and absorb energy in the event of a low or high speed impact, which is a distinction dependent on the density and composition of the foam. The use of honeycomb or honeycomb-like ordered cellular cores to provide reinforcement to one or two flat facesheets have an open-sided sandwich designs and have honeycomb, discrete-stiffened or wine-crate structures extending from the front face of the impact beam back towards the passenger compartment of the vehicle. If a second facesheet is not included between the core and the passenger compartment, then the core material must be relatively dense since it provides most of the flexural stiffness to the structure adjacent to the shear load transfer.

For continuous or discontinuous fiber reinforced polymer matrix composite impact beams, the matrix material may either be a thermoplastic or thermosetting polymer introduced via resin transfer molding, compression molding, blow molding, or other similar fabrication processes.

It is also known in the art to fabricate a three-dimensional network of photopolymer waveguides comprising a unitary truss or lattice architecture, hereafter referred to equivalently as micro-truss or micro-lattice. For example, U.S. Pat. Nos. 7,653,279 and 7,382,959 disclose a process for fabricating such a micro-truss structure. Generally, the process includes providing a reservoir or mold filled with a volume of a curable monomer and covered by a mask including strategically positioned apertures. UV light sources are positioned relative to the mask and exposure to collimated UV light through the mask apertures forms a series of interconnected self-propagating photopolymer waveguides, referred to herein as struts, to form the truss or lattice architecture. Once the photopolymer waveguides are formed, the reservoir is emptied of the unpolymerized monomer which was not exposed to UV light. The micro-truss structure may then undergo a post-cure operation to increase the cross-link density in the photopolymer waveguides. This post-cure may be accomplished via a thermal cure, an additional exposure to UV light, an equivalent method or combination thereof.

SUMMARY OF THE INVENTION

The present disclosure describes a curved sandwich impact structure for a vehicle having a micro-truss core. In one embodiment, the sandwich impact structure includes a micro-truss layer sandwiched between two facesheets, a micro-truss layer designed for energy absorption on the outside of one of the facesheets, and a fascia panel in contact with the energy absorbing micro-truss layer.

Additional features of the present invention will become apparent from the following description and appended claims, taken in conjunction with the accompanying drawings.

BRIEF DESCRIPTION OF THE DRAWINGS

FIG. 7 is an isometric view of a micro-truss structure and enclosure;

FIG. 8 is an exploded isometric view of the structure shown in FIG. 6 being slid into a supporting structure; and FIG. 9 is an isometric view of the micro-truss structure shown in FIG. 8 and being cut at segments to make it flexible.

DETAILED DESCRIPTION OF THE EMBODIMENTS

Figure 1:
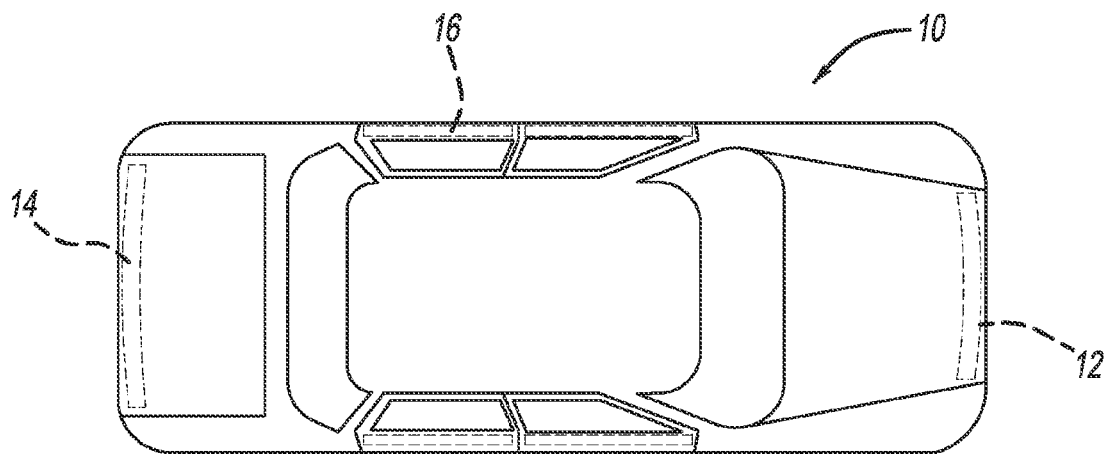
FIG. 1 is a top view of a vehicle showing locations on the vehicle where impact beams may be provided.

The following discussion of the embodiments of the invention directed to a structural impact assembly including two distinct micro-truss layers is merely exemplary in nature, and is in no way intended to limit the invention or its applications or uses. Particularly, the structural impact assembly disclosed herein has particular application for a vehicle impact structural assembly. However, as will be appreciated by those skilled in the art, the structural impact assembly disclosed may have other applications.

As will be discussed in detail below, the present invention proposes a number of structures and related methods for providing an automotive impact beam assembly with a sandwich construction incorporating an architected core material, referred to herein as a micro-truss structure or micro-truss core. The architected core material is composed of a repeating set of ordered three-dimensional polymer waveguides. Although sandwich structures are known in the vehicle impact beam art, what differentiates the present invention from other designs is the use of and formation process for the micro-truss sandwich core. As will be discussed, a sandwich structure with an architected micro-truss core enables impact beam capabilities and performances that were heretofore not possible using known methods.

The micro-truss core material possesses increased stiffness and strength versus alternative stochastic sandwich core materials, such as metal or polymeric foams, given that it enables precise control of the material's spatial arrangement. Higher stiffness and strength in the sandwich core translates into a reduced repair cost in the event of low speed impacts. Micro-truss core materials can be manufactured at much lower costs as compared to other high-strength and high-stiffness core materials, such as metallic or composite honeycombs. Because the micro-truss core is formed in place and directly bonded onto curved surfaces, fasteners and angled faces, it eliminates the need for costly secondary machining and multi-stage bonding operations associated with honeycomb cores. The micro-truss fabrication process enables functional grading, spatial control of the physical and mechanical properties of the core in all three-dimensions using a single material, something which is not possible with all of the other sandwich core forms that have homogeneous physical and mechanical properties at different locations in the core. In an impact beam, functional grading can be used to provide enhanced structural support in localized regions of the beam, such as attachment points, the beam mid-span or likely impact locations. Polymer micro-truss core materials can be integrated into sandwich designs containing aluminum, steel, or carbon fiber reinforced polymer facesheets, or any combination thereof, without the need for corrosion prevention devices or coatings. This is not the case for core materials such as aluminum honeycombs or foams which require galvanic protection when applied to steels or carbon fiber reinforcement polymers. The surfaces of front and rear impact beams are often covered with a soft energy absorbing layer to prevent injury to pedestrians under low speed impact conditions. This energy absorbing material is added after fabrication of the beam, thus increasing part count and manufacturing complexity. In comparison, the same micro-truss process can be used to form both the soft energy absorption layer and the hard energy absorption layer by changing the thickness, orientation, density and chemical composition of the photopolymer waveguides in each layer. The formation of an integral energy absorbing layer on the outside of the impact beam during manufacture of the sandwich construction saves time, cost and reduces the associated part count.

The use of a sandwich construction, particularly one with a micro-truss core, also opens up the design space for impact beams to form geometries that cannot be manufactured using monolithic metal for fiber reinforced polymer composites alone. The sandwich design can circumvent inherent limits for extrusion, pultrusion, stamping, and laminating processes by utilizing simple shapes for the metal or composite facesheet materials to create a complex geometry sandwich.

Within the sandwich construction, the structure of the micro-truss core results in a higher stiffness and strength compared to prior art stochastic core materials. Additionally, the micro-truss architecture allows for the properties of the beam to be spatially tailored to meet anticipated impact conditions. The ability to functionally grade the performance of the micro-truss core throughout the beam ensures the highest level of structural efficiency, i.e., material is only placed where it is required. The method of fabrication presented herein also offers significant improvements over previous sandwich impact beam manufacturing methods. The net shape formation of the micro-truss results in a lower-cost structure as compared to an equivalent performance honeycomb core as a result of the labor-intensive machining and multi-stage bonding operations required for incorporation of the honeycomb structure. Furthermore, the same micro-truss fabrication process can be used to integrate additional parts, such as front and rear energy absorbing padding, into the structure of the impact beam cutting down on part counts and manufacturing time.

Along the length direction, the impact beam may have a non-prismatic cross-section, where the cross-section may vary along the length either by changing the thickness of the facesheets, the thickness of the core, or the density, architecture or composition of the core, i.e., functional grading. In certain embodiments of the invention, the beam has curvature along one axis such that the surface normal vectors of the sandwich cross-section are not parallel to one another along the length of the beam. In an additional embodiment, the beam may be straight so that all beam cross-section surface normals are parallel along the length dimension of the beam. In one embodiment, the width dimension of the impact beam is sealed against air or fluid flow such that the two facesheets comprising the outer surface of the beam form a closed perimeter. Alternately, the cross-section of the beam can be open such that the top and bottom facesheets do not connect and are attached only by the architected core.

In addition to the architected micro-truss material forming the core of the sandwich impact beam, other micro-truss materials may be incorporated at the top facesheet surface of the beam to function as an energy absorption padding material. These energy absorbing truss layers are supported only on one side by the facesheet, with the outer-facing surface unconstrained or bonded to a thin facesheet. Typically, these energy absorbing truss materials are composed of different polymer chemistries compared to that used for the impact beam sandwich core such that the outer energy absorbing material is more compliant than the inner structural reinforcing core.

In the design of the impact beam, mechanical attachment or support hardware features may be added to the beam to couple it to the surrounding vehicle structure or provide functionality in the event of a crash. Particularly, the micro-truss core may be formed directly around internally or externally threaded inserts that provide locations for mechanical attachments passing through one or both facesheet surfaces. Tow lug devices may also be added to the sandwich impact beam structure to provide a hard point for tow line attachment in the event that the vehicle is disabled. The tow lug devices may be fastened to the impact beam, using the aforementioned fastener integration process, bonded directly to the facesheet or welded directly to the beam if one of the sandwich facesheets is metallic.

Continuous carbon fiber reinforced polymer matrix composites can be used to form the facesheets of the sandwich impact beam. However, the micro-truss fabrication process described herein is compatible with a variety of different materials including discontinuous carbon fiber composites, continuous or discontinuous glass fiber composites, unreinforced polymers, aluminum alloys, structural steels, or any combination thereof. This means that both facesheets in the impact beam may be composed of the same material or they may be composed of dissimilar materials. The latter case is highly beneficial when the critical property determining material selection (e.g. stiffness, mass, cost, formability, etc.) is different for both facesheets. However, if dissimilar materials are used for the facesheets, then the open cross-section design may be required to prevent galvanic corrosion or similar material capability issues between the facesheets themselves and not the core.

The micro-truss core structure in the sandwich impact beam is composed of an ordered three-dimensional network of self-propagating polymer waveguides grown from a photo-monomer resin using a controlled exposure to collimated UV light sources at specified orientations through a plurality of apertures in a mask. Any UV-curable photo-monomer or blend thereof that displays the self-propagation phenomenon can be used to form the micro-truss or micro-lattice architecture. Alternatively, the micro-truss may be formed using the aforementioned photo-polymerization technique and then converted or augmented via electro or electro-less plating, reverse casting, vapor deposition, oxidation, dip coating, sputtering, or other suitable process into a hollow or solid metallic, ceramic, or polymer material different from the initial photopolymer. In certain embodiments of the impact beam manufacturing process, the micro-truss core is grown directly on one of the two sandwich facesheets. The second facesheet is then joined to the core using an adhesive material applied to the facesheet and/or the micro-truss. This adhesive may be composed of a single or multi-part paste for a continuous sheet of film. Additional materials, such as glass, scrim or syntactic fillers, may be added to the adhesive to maintain control of the bond line thickness.

Fabrication of the top and bottom facesheets is the first step for production of the impact beam being outlined herein. In one embodiment, these facesheets are composed of a continuous carbon fiber reinforced thermosetting or polymer composite produced from pultruded sections. In addition to these embodiments, the facesheets may be produced with discontinuous carbon fiber reinforcement, continuous or discontinuous glass fiber reinforcement, thermoplastic polymer matrices, unreinforced polymers, metallic facesheets, such as steels, aluminum alloys, etc., or any combination thereof. Consequently, manufacturing methods suited to each type of material may be used to produce the facesheets, including, but not limited to, thermoforming, spraying, injection molding, resin transfer molding, blow molding, stamping, casting, brake forming, roll forming, stretch forming, drawing, etc.

The top and bottom facesheets are formed in order to obtain an open or closed sandwich profile. Additionally, each facesheet may have a prismatic or non-prismatic cross-section along the beam length depending on the beam design and capabilities of the manufacturing processes used to form the beam, i.e., pultruded facesheets must be prismatic. Adhesion promoters or conversion coatings may also be applied to the surfaces of the facesheets in contact with the micro-truss core in order to form a high strength adhesive bond.

When the impact beam design contains curvature along one or more axis one method of introducing curvature is to start with flat facesheet materials and form them into the final curved shape after formation of the micro-truss core. In this case, both top and bottom facesheets do not contain any initial curvature prior to the growth of the core. In additional embodiments, the facesheet materials posses an initial curvature, i.e., are not formed flat, and are fixtured into a flat shape during the micro-truss fabrication process, and then allowed to resume their curved shape upon release from the fixture.

The next step in the impact beam fabrication method is to form the micro-truss core shape directly onto one or both of the facesheets. The micro-truss formation process consists of placing a photo-monomer solution in a mold in contact with one of the facesheets, masking off a two-dimensional area on the opposite surface of the facesheet and mold, exposing the liquid monomer to collimated UV light sources at specific orientations through the patterned mask, and then removing the mask, mold and excess monomer to produce a networked three-dimensional polymer structure bonded to the surface of one or both of the facesheets. If one facesheet in the sandwich structure is transparent at the wavelength of collimated light used to form the micro-truss, then the entire sandwich structure may be formed in a single operation by exposing the monomer to the UV light sources through the transparent facesheet. Subsequently, in this embodiment, the micro-truss forms and bonds onto both facesheet surfaces in contact with the monomer. If both of the facesheets are not transparent at the wavelength of collimated light used to form the micro-truss, then one facesheet must be affixed to the exposed micro-truss surface using a secondary process as described in the following sections.

If the facesheets are initially curved, then one of the facesheets must be fixtured in a flat configuration prior to formation of the micro-truss. Conversely, if the facesheets are initially flat, then no additional fixturing is required. If the sandwich impact beam contains a closed section design, then the mold containing the liquid monomer resin is not required on the closed side of beam, but only at the end points of the beam if these sections are open. During the micro-truss formation process, internally or externally threaded fastener inserts may be inserted into the liquid monomer to form bonded-in-place mechanical attachment points in the core.

Regardless of the curvature, transparency, and section properties of the beam, following formation of the core on one of the facesheets, the excess monomer resin, mold, and pattern mask are removed. The mold and the mask are then cleaned for re-use and the un-polymerized resin may be recycled and used to form the core of a subsequent impact beam. The three-dimensional networked polymer micro-truss structure is then post-cured using a short duration exposure to high intensity UV light in order to fully polymerize the structure and fix it in a final configuration. Alternatively, the post-cure can be accomplished thermally, i.e., in an oven. Prior to this post-cure process, the micro-truss can still undergo deformation without introducing a residual stress state in the core. Therefore, if the impact beam is designed with curvature about one or more axis and the facesheet material is produced in a flat form, a fixture may be used to impart the required degree of curvature to the beam prior to post-curing of the core. Upon post-curing, the beam is removed from the fixture with the imparted curvature maintained by the stiff, post-cured micro-truss core. Conversely, if the facesheet is initially formed in a curved shape, and then the post-cure is performed free standing.

Once the micro-truss core is post-cured in its final shape and if both facesheets are not transparent, the sandwich impact beam is assembled by bonding the top facesheet to the micro-truss core and also the bottom facesheet if a closed section design is used. Whereas, the adhesive bond between the micro-truss core and the bottom facesheet is formed directly during a micro-truss formation process, the bond between the top facesheet and the micro-truss requires a secondary operation. In one embodiment, this secondary operation involves dip or roll coating a layer of paste adhesive onto the exposed top surface of the micro-truss and the bottom facesheet, and then placing the top facesheet in contact with this adhesive layer. The bond surface of the top facesheet may have a conversion coating, primer or other adhesion promoter applied prior to this assembly step. In additional embodiments, other bonding or joining operations may be used to affix the top facesheet to the micro-truss core and the bottom facesheet including, but not limited to, fusion welding, ultrasonic welding, adhesive film bonding, friction welding, spray adhesive bonding, interference fitting, mechanical attachment, etc. It is important to note that the same joining method does not need to be applied to the micro-truss/top facesheet interface as that applied to the top facesheet/bottom facesheet interface.

In an additional embodiment, one or more micro-truss structures are added to the top facesheet of the sandwich structure prior to bonding of the top facesheet to the impact beam. These additional micro-truss structures function as hard or soft energy absorption layers, facing outward from the vehicle to protect pedestrians who may come in contact with the impact beam during a dynamic event. These energy absorbing layers are added to the top facesheet in the exact same manner as the structural micro-truss core is added to the bottom facesheet.

Once the top facesheet is applied to the impact beam, finishing operations are applied to integrate the potential features described above. For instance, subtractive machining operations may be performed to trim sections of the beam or to provide holes for moisture drainage from the core. Additionally, support brackets or mechanical attachments may be added to allow the beam to interface with and transfer loads to surrounding vehicle components. If a tow lug is included in the beam design, it is also attached at this stage by mechanical fasteners or by bonding or welding to a facesheet.

FIG. 1 is a top view of a vehicle 10 including a front bumper impact beam 12, a rear bumper impact beam 14 and side impact anti-intrusion beams 16. The illustration of the vehicle 10 shown in FIG. 1 is intended to give context to the invention discussed below to show locations on the vehicle 10 where high impact resistant, but light weight structural beams are usually provided on a vehicle.

Figure 2:
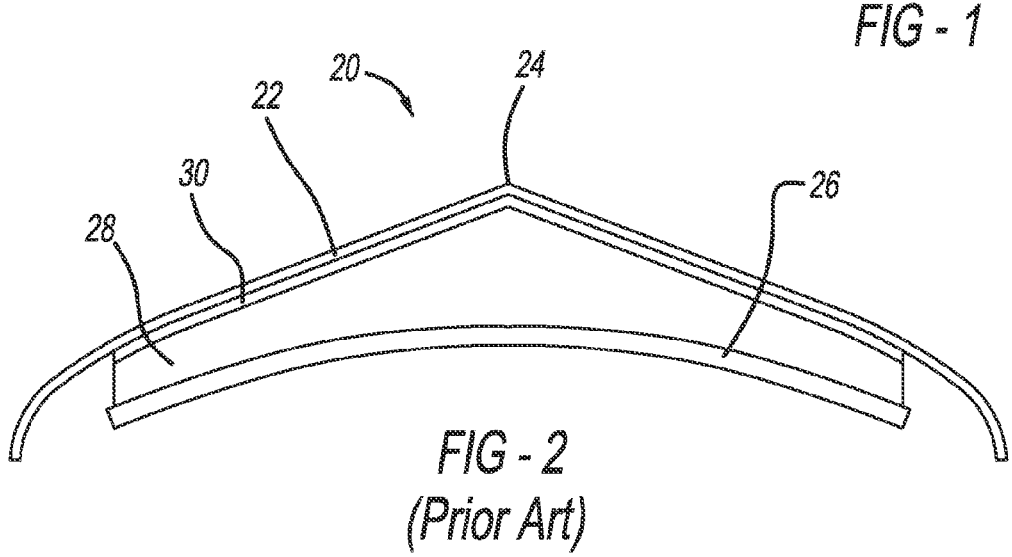
FIG. 2 is a cross-sectional type view showing a known front bumper energy management system for a vehicle.

FIG. 2 is a cross-sectional type view of a known front energy bumper and management system 20 of the type briefly discussed above. The energy management system 20 includes a front fascia panel 22 having a design and configuration for a particular vehicle style and is the show face for the front bumper of the vehicle. Vehicle fascia's can come in various shapes, sizes and materials, and are typically very thin and light weight. For example, the fascia panel 22 can be a thin thermoplastic material configured to have a visually appealing show surface, which can be formed by any suitable plastic molding process. The fascia panel 22 can have any suitable shape including hard angles, such as represented by crease 24.

The energy management system 20 includes an impact beam 26 at the back of the system 20, which provides the main structural integrity of the system 20 against impacts so as to better protect vehicle occupants. The impact beam 26 can be any suitable impact beam known in the art, such as impact beams that are extruded or roll formed aluminum or steel. A hard energy absorbing layer 28, such as a high density structural foam, is secured to the impact beam 26, such as by mechanical interference, glue or the like, and provides a transition between the impact beam 26 typically having a slightly curved configuration readily able to be produced by its forming process to the more highly curved fascia panel 22. The hard energy absorbing layer 28 also provides energy absorption during impacts, generally low energy or slow speed impacts. A soft energy absorbing layer 30 is adhered to the hard energy absorbing layer 28, such as by mechanical interference, glue or the like, and can be a softer foam layer that supports the fascia panel 22, provides a cushion that mitigates injury during interaction with pedestrians and provides a layer having "give" against minor bumps. The fascia panel 22 rests against the soft energy absorbing layer 30.

The present invention proposes employing micro-truss sandwich structures and beam assemblies for structural and/or energy management systems on a vehicle, such as the front energy management system 20. As will be discussed, the proposed energy management system employing the micro-truss structure will eliminate the need for three separate components of the impact beam 26, the hard energy absorbing layer 28 and soft energy absorbing layer 30 so as to reduce cost and weight compromising performance.

Figure 3:
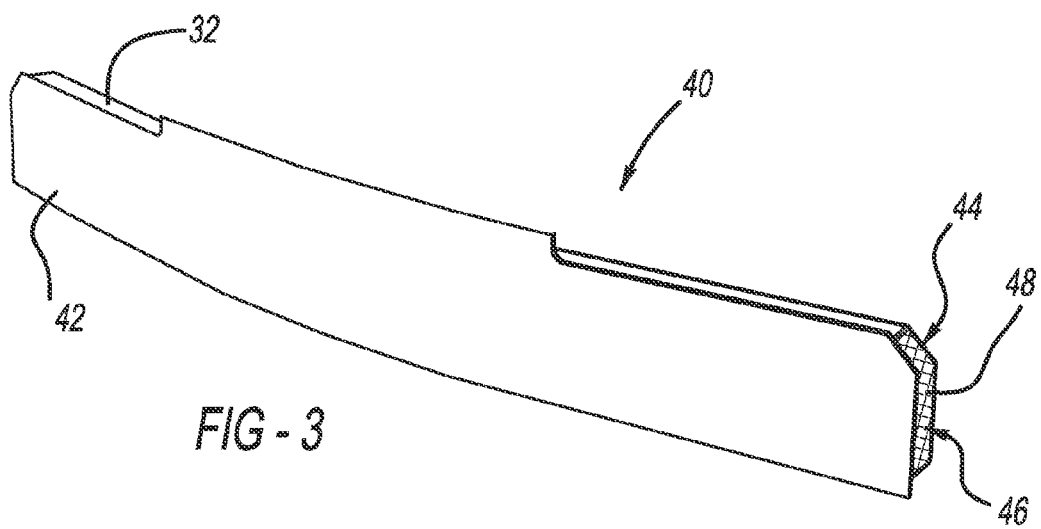
FIG. 3 is an isometric view of a curved impact beam including a top and bottom facesheet with a micro-truss structure formed therebetween.

FIG. 3 is an isometric view of a micro-truss core sandwich beam 40 including a top facesheet 42, such as a layer of aluminum or carbon fiber composite, and a bottom facesheet 44 also being of a aluminum or carbon fiber composite layer, where the facesheets 42 and 44 do not need to be made of the same material, and where the beam 40 has a general curved shape. A micro-truss structure 46 including polymerized struts 48 is formed on the bottom facesheet 44 by the micro-truss fabrication processes known to those skilled in the art. The top facesheet 42 is then secured to the strut nodes that define joined ends of the struts 48 provided by the micro-truss fabrication process by gluing or thermo-bonding the sheet 42 to the nodes. In this embodiment, the beam 40 is closed at the edges by edge panels 32, which may be a folded part of either of the sheets 42 or 44 or a separate panel welded or bonded to the sheets 42 and 44, or secured thereto by some other means.

Figure 4:
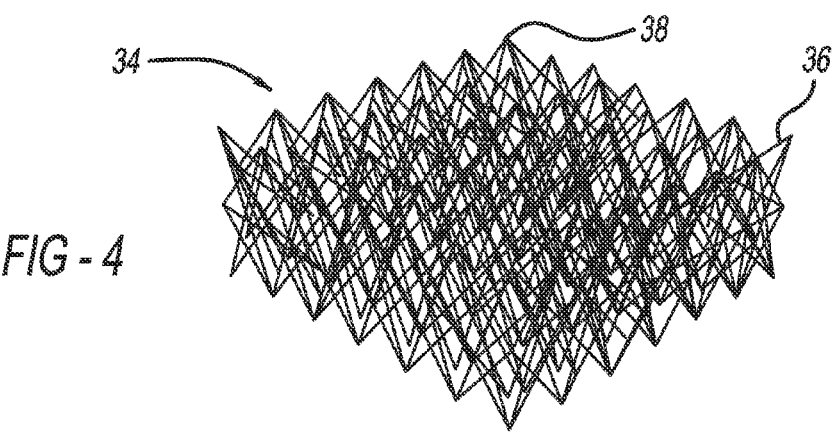
FIG. 4 is an isometric view of a micro-truss architecture suitable for the various micro-truss structures described herein.

FIG. 4 is an isometric view of a micro-truss structure 34 including polymerized struts 36 of the type being discussed herein formed by known micro-truss fabrication techniques, and being suitable for the micro-truss structure 46, as well as various other micro-truss structures being discussed herein. Nodes 38 are depicted at a top surface of the structure 34.

Figure 5:
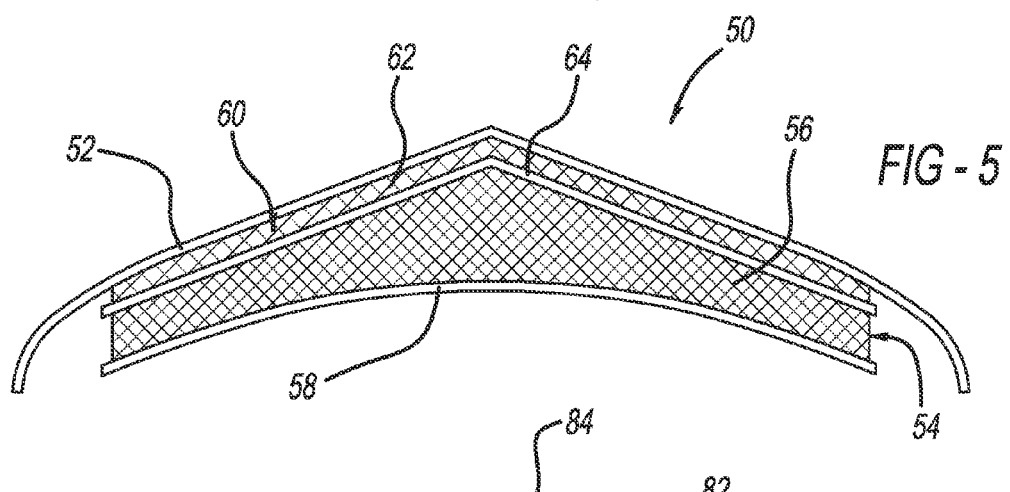
FIG. 5 is a cross-sectional type view showing a front bumper energy management system for a vehicle including two micro-truss layers.

The beam 40 in FIG. 3 is intended to be a general representation of the type of curved beams that can be provided in a vehicle impact beam assembly as described herein. The micro-truss fabrication process can be configured and provided so that the micro-truss structure 46 can be formed on highly and intricately curved support sheets or panels. FIG. 5 is a cross-sectional type view of a front energy management system 50 having a front fascia panel 52 with the same configuration as the front fascia panel 22 from FIG. 2. In this embodiment, the impact beam 26, the hard energy absorbing layer 28 and the soft energy absorbing layer 30 from FIG. 2 are replaced with micro-truss core sandwich structures as described. The functions of the hard energy absorption layer 30 and the impact beam 26 from FIG. 2 are performed by a non-prismatic sandwich beam with a micro-truss core 56, a top facesheet 64 and a bottom facesheet 58. The function of the soft energy absorption layer is performed by the lower effective modulus micro-truss layer 60 that is grown on the top facesheet 64 of the sandwich beam. The soft energy absorbing micro-truss structure 60 has a lower effective modulus than the micro-truss core 54, which can be provided by one or more of the thickness of the micro-truss structure, the type of material of the struts 56 and 62, the size and diameter of the struts 56 and 62, the spacing of the struts 56 and 62, combinations thereof, etc. The sheet 64 is adhered to the nodes of the micro-truss structure 54 in the same manner as the facesheet 42 was adhered to the micro-truss structure 46. The front fascia panel 52 is then mounted such that it is in contact with the top nodes of the micro-truss structure 60.

Figure 6:
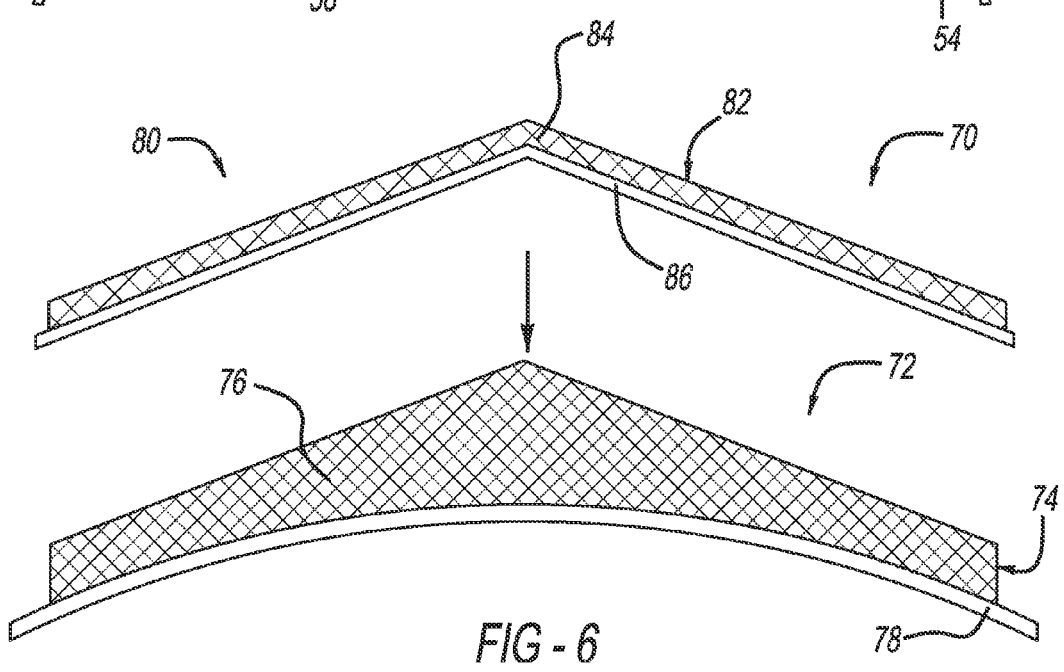
FIG. 6 is an exploded side view of an energy management system including two micro-truss layers.

FIG. 6 is an illustration of an exploded micro-truss assembly 70 to help show the formation of the hard energy absorbing micro-truss structure 54 and the soft energy absorbing micro-truss structure 60 referred to above. The assembly 70 includes a hard energy absorbing micro-truss structure 72 that includes a micro-truss 74 having polymerized struts 76 formed on a facesheet 78. During manufacture of the structure 72, the area where the micro-truss 74 will be formed is blocked off by a suitable enclosure (not shown) and a mask is provided over the enclosure. Resin is then poured into the enclosure and multiple light sources expose the resin to collimated light through the apertures of the mask to form the struts 76. While the struts 76 are in their partially cured state, the residual monomer resin is removed from the enclosure and the remaining partially cured micro-truss 74 is fully cured by a suitable heat source or UV radiation. The assembly 70 also includes a soft energy absorbing micro-truss structure 80 including a micro-truss 82 having struts 84 formed on a top facesheet 86. The structure 80 is formed by the same process as the hard energy absorbing structure 72 and when both of the structures 72 and 80 are fully cured, the top facesheet 86 is bonded to the micro-truss 74 by an adhesive bonding operation or other suitable joining process.

In the embodiment discussed above, the hard micro-truss energy absorbing layer is formed separately from the soft micro-truss energy absorbing layer and then the bottom sheet of the soft energy absorbing layer is secured to the top surface of the micro-truss structure of the hard energy absorbing layer. The present invention also proposes reducing some of these manufacturing steps in order to reduce costs by forming the hard energy absorbing micro-truss structure with both a top sheet and a bottom sheet.

FIG. 7 is an isometric view of a micro-truss structure 90 including a support enclosure 92. The micro-truss structure 90 is shown having a square shape solely for discussion and illustrative purposes, where the particular shape of the structure 90 can be any shape, width, height, length, etc. for a particular vehicle structural and/or energy management system or otherwise including the shapes shown in FIG. 5. The enclosure 92 includes in this example six sidewalls 94 to define the complete support enclosure 92, where one of the sidewalls 94 is removed to show a micro-truss core 96 formed within the enclosure 92 including polymerized struts 98. The sidewalls 94 are comprised of a very thin and low structural integrity material, such as thin plastic sheets, designed merely to hold the liquid polymer resin within the enclosure 92 during formation of the micro-truss core 96. Particularly, the enclosure 92 is made as lightweight and flimsy as possible to perform its purpose of holding the uncured resin so as to be able to conserve material and cost.

At least a top panel 100 of the support enclosure 92 is made of a UV transparent material, such as acrylic, that allows the UV curing light for the polymer resin within the enclosure 92 to form the struts 98 in the known manner. Particularly, a suitable mask 104 including apertures 106 is positioned above the panel 100 and a configuration of UV light sources 108 shine UV light through the mask 104 and through the panel 100 so that it partially cures the polymeric resin within the support enclosure 92 in the known manner to form the micro-truss core 96. Because the light hits the inside surface of all of the panels 94, the micro-truss core 96 is secured to all of the panels 94 of the enclosure 92 when formed, and particularly the top and bottom panels of the enclosure 92. The panels 94 other than the top panel 100 can also be made of the UV transparent material, or can be made of another less expensive material, if appropriate. Drain holes 102 are provided in the enclosure 92 to remove the un-cured liquid resin left therein after the micro-truss core 96 has been formed at least to a partially cured state.

As mentioned, the panels 94 of the enclosure 92 are very thin and do not provide the structural integrity necessary for impact beams, energy management systems, structural elements, etc. for a vehicle. While the micro-truss core 96 is in a partially cured state within the support enclosure 92 it is inserted into a structural enclosure that provides that function. FIG. 8 is an exploded isometric view of a structural assembly 110 including the micro-truss structure 90 and an outer structural enclosure 112 in which the structure 90 is inserted. Particularly, the structural enclosure 112 includes four side panels 116 defining an open inside area 114 having an open side 118 through which the structure 90 is inserted. Although the structural enclosure 112 is shown having the same shape as the structure 90, the structural enclosure 112 can have a slightly different shape than the structure 90. Because the micro-truss core 96 is only partially cured and the enclosure 92 is very thin, the structure 90 is pliable and flexible so that it can be bent and readily conformed to the shape of the outer enclosure 112. Once the structure 90 is inserted into the enclosure 112 it is secured thereto in any suitable manner, such as by bolts 120, an adhesive or other suitable fasteners. The micro-truss core 96 is also fully cured at this time, such as by placing the assembly 110 in an oven. The combination of the outer enclosure 112 and the enclosed micro-truss structure 90 forms a structural member that can be designed for stiffness, strength, energy absorption, etc. The enclosure 112 can be made of any suitable material for a particular application, such as a high modulus strength wear resistant, chemical resistant material, and can be made by any suitable technique, such as by roll forming. Further, the structure 112 can have the particular shape of the energy management system or other application desired. By separating the fabrication process for the structure 90 and the outer enclosure 112, different processes and fabrication techniques can be employed for efficiency volume of the produced parts.

Although the outer enclosure 112 is shown as a single piece member, in other embodiments, the enclosure 112 can be configured as multiple pieces, where, for example, the enclosure 92 is inserted into one piece and another piece is then placed over the first piece and secured thereto. It is further noted that the micro-truss core 96 need not specifically match the shape of the outer enclosure 112, where the structure 90 only fills some of the space of the enclosure 92.

The discussion above includes curing the micro-truss core 96 to its final rigid state after the structure 90 has been inserted into the outer enclosure 112 so as to allow it to be readily shaped to the outer enclosure 112 before it is fully cured. However, for certain fabrication processes, it may be desirable to fully cure the micro-truss core 96 before the structure 90 is inserted into the enclosure 112. According to another embodiment of the invention, the micro-truss core 96 is fully cured in the enclosure 92 using normal micro-truss structure fabrication techniques. If the resin is of a proper thermoset material and the enclosure 92 is of a suitable type of material, heating the micro-truss core 96 and the enclosure 92 above a known transition temperature $T_g$ for the particular materials causes those materials to become pliable and flexible, where they can then be conformed to the enclosure 112 while being held above the transition temperature. The temperature $T_g$ is below a temperature where the structure 90 will become irreversibly damaged. Once the structure 90 is in the enclosure 112 to form the assembly 110, then the temperature can be reduced below the transition temperature $T_g$ where the micro-truss core 96 will return to its rigid cured state. This process of heating the micro-truss core 96 after it has been fully cured to allow it to be conformed to the desired shape may have advantages above those of the post curing micro-truss structure processes referred to above because it will allow a repeated shape change to better fit within the processing needs of the sandwich micro-truss structure beam.

FIG. 9 is an isometric view of the structure 90, which shows the structure 90 having more length than in FIG. 6, but being of the same configuration. If the outer structural enclosure 112 has a curved configuration, then it may be desirable to form slots 122 in the panels 94 at certain intervals along the length of the structure 90 to form flexible segments 124 in the structure 90 that allow it to more easily conform to the curved shape of the outer enclosure 112.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A structural assembly comprising:
    a stiff micro-truss layer including a base sheet and a micro-truss core formed thereon, where the micro-truss core comprises a 3-dimensional lattice of uniaxial micro-truss struts interconnected at nodes; and
    a top sheet secured to nodes of the micro-truss core opposite to the base sheet to form a micro-truss sandwich structure.

2. The structural assembly according to claim 1 further comprising an energy absorbing micro-truss layer including the top sheet and a micro-truss core formed thereon, said energy absorbing micro-truss layer being less rigid than the stiff micro-truss layer, said structural assembly further comprising a panel secured to the micro-truss core of the energy absorbing layer opposite to the top sheet.

3. The structural assembly according to claim 2 wherein the top sheet has a different shape than the base sheet.

4. The structural assembly according to claim 2 wherein the stiff micro-truss layer and the energy absorbing micro-truss layer are both curved layers.

5. The structural assembly according to claim 4 wherein the energy absorbing micro-truss layer has a higher degree of curvature than the stiff micro-truss layer.

6. The structural assembly according to claim 2 wherein the energy absorbing micro-truss layer is less rigid than the stiff micro-truss layer because of one or more of a thickness of the layer, a diameter of the micro-truss struts, a spacing of the struts, an orientation of the struts and a material comprising the struts.

7. The structural assembly according to claim 2 wherein the top sheet is glued to the nodes of the micro-truss struts at a surface of the stiff micro-truss core.

8. The structural assembly according to claim 7 wherein the energy absorbing micro-truss layer and the stiff micro-truss layer are formed by separate micro-truss fabrication processes before they are secured together.

9. The structural assembly according to claim 1 wherein one or more of the base sheet and the top sheet are transparent at the wavelength of light used to form the micro-truss layers.

10. The structural assembly according to claim 1 wherein the base sheet and the top sheet are selected from the group consisting of thermoplastic sheets, thermoset sheets, aluminum sheets, steel sheets, glass fiber composite sheets and carbon fiber composite sheets.

11. The structural assembly according to claim 1 wherein the top sheet and the base sheet are different materials.

12. The structural assembly according to claim 1 wherein the structural assembly is a vehicle energy management bumper system.

13. The structural assembly according to claim 1 wherein the structural assembly is a vehicle side anti-intrusion bar.

14. A vehicle energy management bumper system comprising:
    a curved stiff micro-truss layer including a base sheet and a micro-truss core having a 3-dimensional lattice of uniaxial polymerized struts formed thereon;
    a curved energy absorbing micro-truss layer including a base sheet and a micro-truss core having a 3-dimensional lattice of uniaxial polymerized struts formed thereon, said energy absorbing micro-truss layer being less rigid than the stiff micro-truss layer and said energy absorbing layer base sheet having a different shape than the stiff layer base sheet, said energy absorbing layer base sheet being secured to the stiff micro-truss layer core opposite to the stiff layer base sheet; and
    a front fascia panel secured to nodes of the energy absorbing layer micro-truss core opposite to the energy absorbing layer base sheet, where the nodes are points of interconnection between the uniaxial polymerized struts.

15. The bumper system according to claim 14 wherein the base sheets are selected from the group consisting of thermoplastic sheets, thermoset sheets aluminum sheets, steel sheets, glass fiber composite sheets, and carbon fiber composite sheets.

16. The bumper system according to claim 14 wherein the energy absorbing layer base sheet and the stiff layer base sheet are different materials.

17. The bumper system according to claim 14 wherein one or more of the energy absorbing layer base sheet and the stiff layer base sheet are transparent at the wavelength of light used to form the micro-truss layers.

18. The bumper system according to claim 14 wherein the energy absorbing micro-truss layer has a higher degree of curvature than the stiff micro-truss layer.

19. The bumper system according to claim 14 wherein the energy absorbing micro-truss layer is less rigid than the stiff micro-truss layer because of one or more of a thickness of the layer, a diameter of the uniaxial polymerized struts, a spacing of the struts, an orientation of the struts and a material comprising the struts.

20. The bumper system according to claim 14 wherein the energy absorbing base sheet is glued to the nodes of the micro-truss struts at a surface of the stiff micro-truss core.

21. The bumper system according to claim 20 wherein the energy absorbing micro-truss layer and the stiff micro-truss layer are formed by separate micro-truss fabrication processes before they are secured together.

22. A method for providing a vehicle structural assembly, said method comprising:
  fabricating a stiff micro-truss layer by irradiating an enclosure filled with liquid photomonomer resin through a mask so as to form a micro-truss structure from a plurality of interconnected photopolymer waveguides secured to a base sheet;
  fabricating an energy absorbing micro-truss layer by irradiating an enclosure filled with liquid photomonomer resin through a mask so as to form a micro-truss structure from a plurality of interconnected photopolymer waveguides secured to a base sheet, wherein the micro-truss structure for the energy absorbing micro-truss layer is less rigid than the stiff micro-truss layer, and the waveguides in the stiff micro-truss layer and the energy absorbing micro-truss layer form a 3-dimensional lattice of uniaxial micro-truss struts interconnected at nodes; and
  securing the base sheet of the energy absorbing micro-truss layer to nodes of the micro-truss structure of the stiff micro-truss layer.

23. The method according to claim 22 further comprising securing a front fascia panel to the energy absorbing layer micro-truss structure opposite to the energy absorbing layer base sheet.

24. The method according to claim 22 wherein the energy absorbing micro-truss layer and the stiff micro-truss layer are both curved layers.

* * * * *